Sept. 16, 1969  A. I. APPLETON  3,467,336
BRAKE FOR FISHING REELS
Filed Feb. 13, 1967
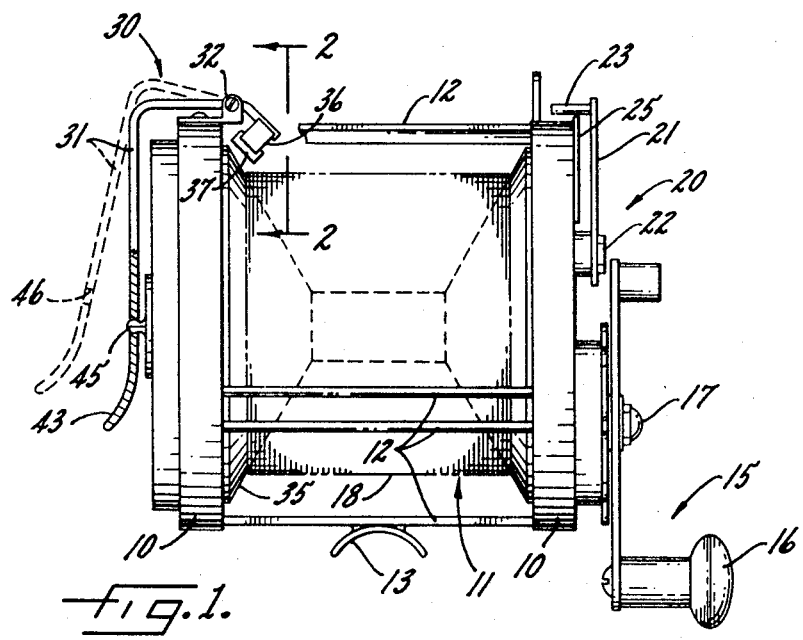
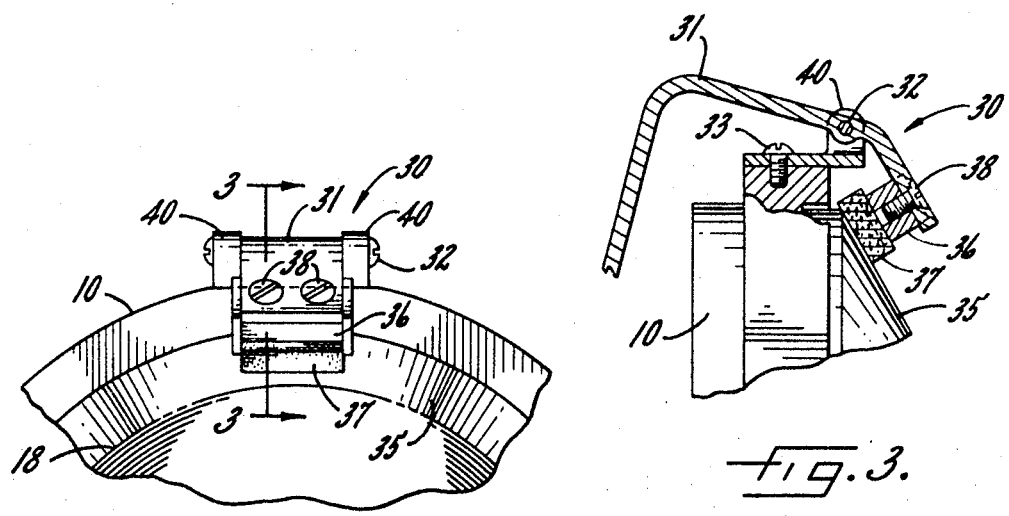
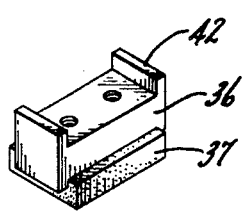
INVENTOR.
Arthur I. Appleton,
BY
Wolfe, Hubbard, Voit & Osann
ATTORNEYS.

United States Patent Office 3,467,336
Patented Sept. 16, 1969

3,467,336
BRAKE FOR FISHING REELS
Arthur I. Appleton, 1701 Wellington Ave.,
Northbrook, Ill. 60657
Filed Feb. 13, 1967, Ser. No. 615,769
Int. Cl. A01k 89/02; B65h 17/44
U.S. Cl. 242—84.53                                      3 Claims

ABSTRACT OF THE DISCLOSURE

A manually-operable brake mechanism for fishing reels is described in which a brake shoe of frictional material is brought to bear against an exposed rotating surface of the fishing reel spool by manual actuation of an operating lever. When not in use, the operating lever is detentably retained out of the way against the reel frame. The described reel brake operates either independently or in conjunction with a conventional internal drag brake for conveniently varying the amount of braking force on the spool while the operator is engaged in landing a fish.

This invention relates to the design and construction of fishing reels, and more particularly to a new and improved brake mechanism for such reels.

Most reels for use in sport fishing are equipped with a drag brake mechanism by which a frictional resistance may be applied to the fishing line as it is being paid out. The purpose of such a device is to allow a line to be drawn from the reel during the course of playing a fish while maintaining a substantially constant tension on the line. This allows the fish to be played without danger of the line slackening and the fish being lost.

With conventional spool-type reels, as opposed to the more recently developed spinning reels, a rotating spool is employed in conjunction with a winding mechanism incorporating a crank and gearing of some kind. When a fish is hooked, the operator winds the crank in order to wind line onto the spool of the reel, thereby drawing the fish in. When the fish runs, the operator pays line out by allowing the crank to rotate in the reverse direction, being careful to maintain tension so that the line does not go slack.

In playing large fish, or when light tackle is used having a line with a low breaking strength, it is desirable to provide a reel brake which lessens the chance that the fish can exert a force sufficient to break the line. This is normally accomplished with a reel drag brake which is essentially a frictional coupling between the spool and the winding mechanism which slips when a force is exerted on the line which would otherwise break it. Such a force might occur when a fish pulled against a locked spool, or when the operator exerted too great a force on the winding mechanism in an attempt to bring the fish in.

Heretofore, drag brakes for fishing reels have generally comprised a single friction clutch which allows the spool to slip when the force tending to rotate it with respect to the winding mechanism exceeds a predetermined value. This value is usually adjustable through a suitable mechanism, such as an adjustable pressure plate controlled by an external screw or lever. While it is sometimes possible to adjust these mechanisms while a fish is actually being played, generally such a procedure is made difficult or impossible by the nature of the adjustable drag and the proximity of such controls to the winding crank.

A single mechanical drag of the foregoing type presents additional problems when used with a reel having a "backing" or reserve winding of line of lesser strength than the primary line. The fixed drag is ideally set so as to prevent breakage of the weaker backing line, but this prevents the stronger primary line from being used to the greatest advantage because it can withstand a pull against a heavier drag setting which might break the backing.

To overcome the foregoing difficulties, the present invention contemplates a separate reel brake mechanism, independent from the fixed drag brake mechanism usually found on such fishing reels. The invention has as one of its principal objects the provision of such a brake which is instantly and easily varied in its frictional effect during the actual playing of a game fish without interfering with the manipulation of the winding mechanism by the operator. It is intended that this improved drag brake mechanism be useful either independently of the fixed drag, or in conjunction with a drag mechanism of the conventional type, so that should the conventional fixed drag be incorrectly adjusted when the fish is hooked the fish will not be lost. Related to this function is the objective of providing a back-up or fail-safe drag mechanism in case the fixed drag mechanism should fail during operation.

In conjunction with these purposes, it is a further object to provide a brake mechanism which is capable of absorbing a large amount of frictional energy during the playing of a large fish without substantial variation in its frictional qualities. In this connection it is also contemplated that the mechanism will be compact, easily operated by the operator's free hand during the playing of a fish, and unlikely to jam or fail during operation. When not in use, it is contemplated that the mechanism should be easily stored in a ready position in which no interference is encountered with respect to normal operation of the reel.

Other objects and advantages of the invention will become apparent upon reading the following description and upon reference to the drawings, in which:

FIGURE 1 is a frontal elevation of a fishing reel incorporating the reel brake of the present invention;

FIG. 2 is an enlarged fragmentary portion of the reel, taken in the plane 2—2 of FIG. 1;

FIG. 3 is a fragmentary section taken in the plane 3—3 of FIG. 2; and

FIG. 4 is a perspective of the brake shoe shown in conjunction with the mechanism in the previous figures.

While the invention will be described in connection with a preferred embodiment, it will be understood that I do not intend to limit the invention to that embodiment, but intend to cover all alternative and equivalent constructions as may be included within the spirit and scope of the invention as defined by the appended claims.

Turning now to the drawings, there is shown in FIG. 1 a fishing reel having a brake mechanism constructed according to the present invention. The reel is constructed with a frame having side members 10 between which a spool 11 is journaled. The side members 10 are connected by crosspieces 12 so as to rigidly retain the spool 11 in its bearings (not shown). On one cross member 12, a curved mounting plate 13 is fastened so that the reel may be attached to a corresponding mount on a fishing rod.

On one of the side members 10 a winding mechanism is provided, having a crank 15 with a handle 16. The crank 15 is journaled about a shaft 17, and a gear mechanism (not shown) connects the shaft 17 to the spool 11 so that fishing line 18 (shown in phantom) may be wound onto the spool or paid out, as the operator desires.

On the same side member 10 with the crank is located a conventional drag brake 20. This type of drag brake is well known, and will not be described in detail. Generally, this brake comprises an adjustable internal friction clutch or brake which provides a slippable connection between the winding mechanism and the spool 11. In the illustrated example, the adjustment is performed by moving an adjustment lever 21 to rotate an adjustment shaft 22 connected to the internal friction mechanism (not shown). An indicator 23 is provided on the adjustment lever 21 which is engageable with a detent plate 25 on which varying degrees of drag are indicated. The drag adjustment for this mechanism is substantially fixed after initially being set, however, and it is generally quite difficult to adjust the mechanism during the playing of a fish. As can be seen, the rotation of the crank 15 would interfere with an attempt by the operator to reset the drag 20 should it be determined after a fish had been hooked that the adjustment was incorrect.

In accordance with the invention, an auxiliary reel brake 30 is provided which is manually operated from the side of the reel opposite the winding mechanism and is instantly and easily variable in its frictional effect by the operator while a fish is being played. This is accomplished through the provision of a brake lever 31 which lies alongside the side member 10 of the spool opposite the handle 16 and associated winding mechanism. The lever 31 is pivoted about a fulcrum 32 which is attached to the side member 10 by screws 33 or other suitable fasteners. The fulcrum 32 is positioned adjacent one end of the spool 11, which is provided with a portion of exposed peripheral surface 35. The purpose of this surface 35 is to serve as a friction surface against which a brake shoe 36 may be brought to bear by actuation of the lever 31.

The brake shoe itself is preferably made with a facing 37 of relatively hard, heat-resistant frictional material such as is commonly employed in the brake shoes of automobiles. The facing 37 is bonded through the use of heat-resistant adhesives or the like to the shoe 36, which is in turn secured to the lever 31 by screws 38 or other suitable means.

It will be observed that in the illustrated preferred embodiment the fulcrum 32 and brake shoe 36 are constructed so as to resist the sideways thrust generated during the braking action of the facing 37 against the peripheral spool surface 35. For this purpose, lugs or ears 40 are provided on the fulcrum 32 which securely anchor the lever 31 in its pivots. Likewise, the brake shoe 36 is also provided with lugs 42 which anchor the shoe 36 into position with respect to the lever 31.

At the other end of the lever 31 there is provided an outturned portion 43 which stands slightly away from the side member 10 of the reel for easy grasping. Pursuant to the invention, the normal rest position of the lever 31 is as shown in FIG. 1, with the lever lying closely alongside the side member 10. In this position it is well out of the way when not in use, and the brake shoe 36 is held away from the peripheral surface 35 of the spool 11, allowing the latter to run free in either direction.

To use the brake of the present invention, it is merely necessary for the operator to grasp the outturned portion 43 with his free hand and pull it upward and outward away from the side member 10. The operator thereby exerts a force through the lever 31 to bring the brake shoe 36 into frictional engagement with the exposed peripheral spool portion 35, and a braking force is thus exerted which is proportional to the operator's effort in lifting the end of the lever 31. The braking force provided the spool 11 is proportional to the operator's effort, and is instantly and easily available to suit the conditions encountered during the playing of a fish.

To conveniently provide for maintaining the auxiliary reel brake in a rest, or disengaged, position, a spring and detent mechanism is provided. This consists simply of a split spring pin 45 which is engageable with a corresponding opening 46 in the lever 31. The pin 45 is preferably provided with a split rounded head which, when compressed together against the spring force, is capable of snapping smoothly into the hole 46. In this way, the lever 31 easily and reliably detents into position alongside the reel side member 10, and is conveniently snapped in and out of place as the operator desires.

It will be appreciated that the manual reel brake of the present invention may be used separately of the usual drag brake mechanism 20 during the playing of a fish. In certain situations, it may be desirable to disengage the existing reel brake 20 entirely and rely on the auxiliary brake 30. In other situations, it may be preferable to use the two devices in conjunction with one another, with the auxiliary brake 30 providing a fine degree of instantly adjustable drag in order to meet the changing conditions of playing a game fish.

I claim as my invention:

1. In a fishing reel having a frame and a rotatable spool adapted to receive and pay out fishing line, said spool having an exposed peripheral surface adjacent said frame, a reel brake mechanism comprising in combination
   a fulcrum carried by said frame adjacent said exposed peripheral surface,
   a lever pivoted about said fulcrum,
   a brake shoe carried by said lever and frictionally engageable with said exposed peripheral surface,
   said lever having a manually operable extension whereby said brake shoe may be selectively engaged against said peripheral surface,
   said manually operable extension of said lever lying substantially parallel and adjacent to said frame, and in which the movement of said manually operable extension away from said frame acts to lever said brake shoe into frictional engagement with said peripheral surface,
   said manually operable extension having a rest position adjacent said frame in which said brake shoe does not contact said peripheral surface, and
   a spring and detent for detentably retaining said lever in said rest position when said reel brake mechanism is not in use.

2. A reel brake mechanism as defined in claim 1 in which said spring and detent comprises a spring-loaded projection carried by said frame, said projection being engageable with a corresponding opening in said lever for detentably retaining said lever in said rest position.

3. A fishing reel comprising in combination
   a frame,
   a rotatable spool carried by said frame and adapted to receive and to pay out fishing line, said spool having an exposed peripheral surface adjacent said frame,
   a winding mechanism including a handle at one end of said frame for rotating said spool with respect to said frame,
   a first reel brake mechanism carried by said frame and frictionally engageable with said spool for retarding the rotation thereof,
   a second reel brake mechanism carried by said frame at the end opposite said handle, said second reel brake mechanism comprising a fulcrum carried by said frame adjacent said exposed peripheral surface,
   a lever pivoted about said fulcrum,
   a brake shoe carried by said lever and engageable with said exposed peripheral surface, said lever having a manually operable extension whereby said brake shoe may be selectively engaged against said peripheral surface,
   said manually operable extension of said lever lying substantially parallel and adjacent to said frame, and in which the movement of said manually operable extension away from said frame acts to lever said brake shoe into frictional engagement with said peripheral surface,
   said manually operable extension having a rest position adjacent said frame in which said brake shoe does not contact said peripheral surface, and
   a spring and detent for detentably retaining said lever in said rest position when said second reel brake mechanism is not in use.

(References on following page)

References Cited

UNITED STATES PATENTS

| | | | |
|---|---|---|---|
| 2,572,354 | 10/1951 | King | 242—84.53 XR |
| 2,725,201 | 11/1955 | Miller | 242—84.53 |
| 2,941,748 | 6/1960 | Matthiesen | 242—84.53 XR |

FOREIGN PATENTS 3,459 11/1905 Great Britain.

BILLY S. TAYLOR, Primary Examiner

U.S. Cl. X.R.

242—99